US012614432B2

(12) United States Patent
Shimizu et al.

(10) Patent No.: US 12,614,432 B2
(45) Date of Patent: Apr. 28, 2026

(54) TERMINAL APPARATUS HAVING DUAL DISPLAYS

(71) Applicant: NEC Corporation, Tokyo (JP)

(72) Inventors: Takashi Shimizu, Tokyo (JP); Hiroshi Morimitsu, Tokyo (JP); Takahiro Ambe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/730,848

(22) PCT Filed: Feb. 1, 2022

(86) PCT No.: PCT/JP2022/003819
§ 371 (c)(1),
(2) Date: Jul. 22, 2024

(87) PCT Pub. No.: WO2023/148816
PCT Pub. Date: Aug. 10, 2023

(65) Prior Publication Data
US 2025/0104538 A1 Mar. 27, 2025

(51) Int. Cl.
*G07G 1/00* (2006.01)

(52) U.S. Cl.
CPC .................................. *G07G 1/0018* (2013.01)

(58) Field of Classification Search
CPC ............................... G07G 1/0018; G07G 1/01
USPC .......................................................... 235/383
See application file for complete search history.

(56) References Cited

U.S. PATENT DOCUMENTS

| | | | | |
|---|---|---|---|---|
| 2013/0334376 | A1 | 12/2013 | Moscovitch | |
| 2019/0251797 | A1* | 8/2019 | Yajima | G07G 1/0018 |
| 2019/0279470 | A1 | 9/2019 | Nishio et al. | |

FOREIGN PATENT DOCUMENTS

| | | | | |
|---|---|---|---|---|
| CN | 205486535 | U | * | 8/2016 |
| JP | 2010-026776 | A | | 2/2010 |
| JP | 2010-271713 | A | | 12/2010 |
| JP | 2013182485 | A | * | 9/2013 |
| JP | 2014229285 | A | * | 12/2014 |
| JP | 2017-187853 | A | | 10/2017 |
| JP | 2018-072971 | A | | 5/2018 |
| JP | 2021-149188 | A | | 9/2021 |

OTHER PUBLICATIONS

Machine translation of JP 2014229285 retrieved from European Patent Office on Mar. 21, 2025 (Year: 2025).*
Machine translation of CN 205486535 retrieved from European Patent Office on Mar. 21, 2025 (Year: 2025).*
Machine translation of JP 2013182485, retrieved from European Patent Office on Sep. 18, 2025 (Year: 2025).*
International Search Report for PCT Application No. PCT/JP2022/003819, mailed on Apr. 5, 2022.

* cited by examiner

*Primary Examiner* — Suezu Ellis

(57) ABSTRACT

A terminal apparatus (10) is used when at least one of product registration processing and settlement processing is performed, and includes a first display (150), a second display (140), and an input device (172). The first display (150) is located next to the second display (140). A lower end of the first display (150) is located higher than a lower end of the second display (140). The input device (172) is disposed in a region located below the first display (150).

8 Claims, 6 Drawing Sheets

TERMINAL APPARATUS HAVING DUAL DISPLAYS

This application is a National Stage Entry of PCT/JP2022/003819 filed on Feb. 1, 2022, the contents of all of which are incorporated herein by reference, in their entirety.

TECHNICAL FIELD

The present invention relates to a terminal apparatus.

BACKGROUND ART

At a retail store and the like, as represented by a POS terminal, a terminal apparatus that performs at least one of product registration processing and settlement processing is used. As one example of such a terminal apparatus, there is a POS terminal apparatus described in Patent Document 1. The POS terminal includes a salesclerk display unit and a customer display unit. The customer display unit includes a settlement information display unit and an advertisement display unit.

RELATED DOCUMENT

Patent Document

Patent Document 1: Japanese Patent Application Publication No. 2017-187853

DISCLOSURE OF THE INVENTION

Technical Problem

In order to increase information provided to a customer or a salesclerk, as described in Patent Document 1, a plurality of display units may be provided on a customer side or a salesclerk side in a terminal apparatus. Meanwhile, a salesclerk or a customer often performs an input on a terminal apparatus at a time of product registration or at a time of settlement. When a salesclerk or a customer performs the input, there is a possibility that a display for displaying information interferes.

One example of an object of the present invention is to reduce a possibility that a display for displaying information interferes when a salesclerk or a customer performs an input on a terminal apparatus.

Solution to Problem

One aspect of the present invention provides a terminal apparatus that is used when at least one of product registration processing and settlement processing is performed, and includes:

a first display;

a second display; and an input device disposed in a region located below the first display, and including an input region where information is input, wherein the first display is located next to the second display, and a lower end of the first display is located higher than a lower end of the second display.

Advantageous Effects of Invention

One aspect of the present invention reduces a possibility that a display for displaying information interferes when a salesclerk or a customer performs an input on a terminal apparatus.

BRIEF DESCRIPTION OF THE DRAWINGS

The above-described object, the other objects, features, and advantages will become more apparent from suitable example embodiments described below and the following accompanying drawings.

EXAMPLE EMBODIMENT

Hereinafter, example embodiments of the present invention will be described with reference to the drawings. Note that, in all of the drawings, a similar component has a similar reference sign, and description thereof will be appropriately omitted.

Figure 1:
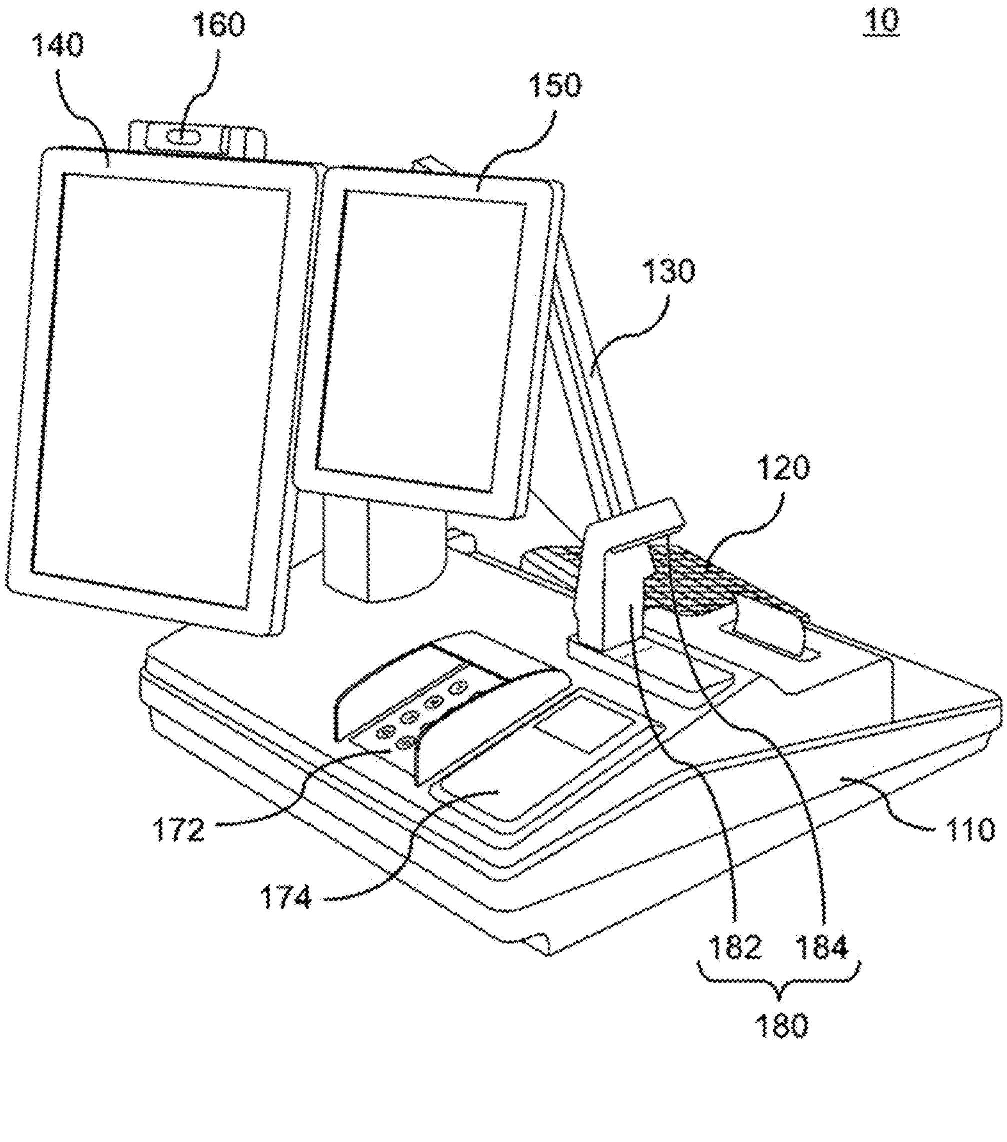
FIG. 1 is a perspective view of a terminal apparatus according to an example embodiment.
Figure 2:
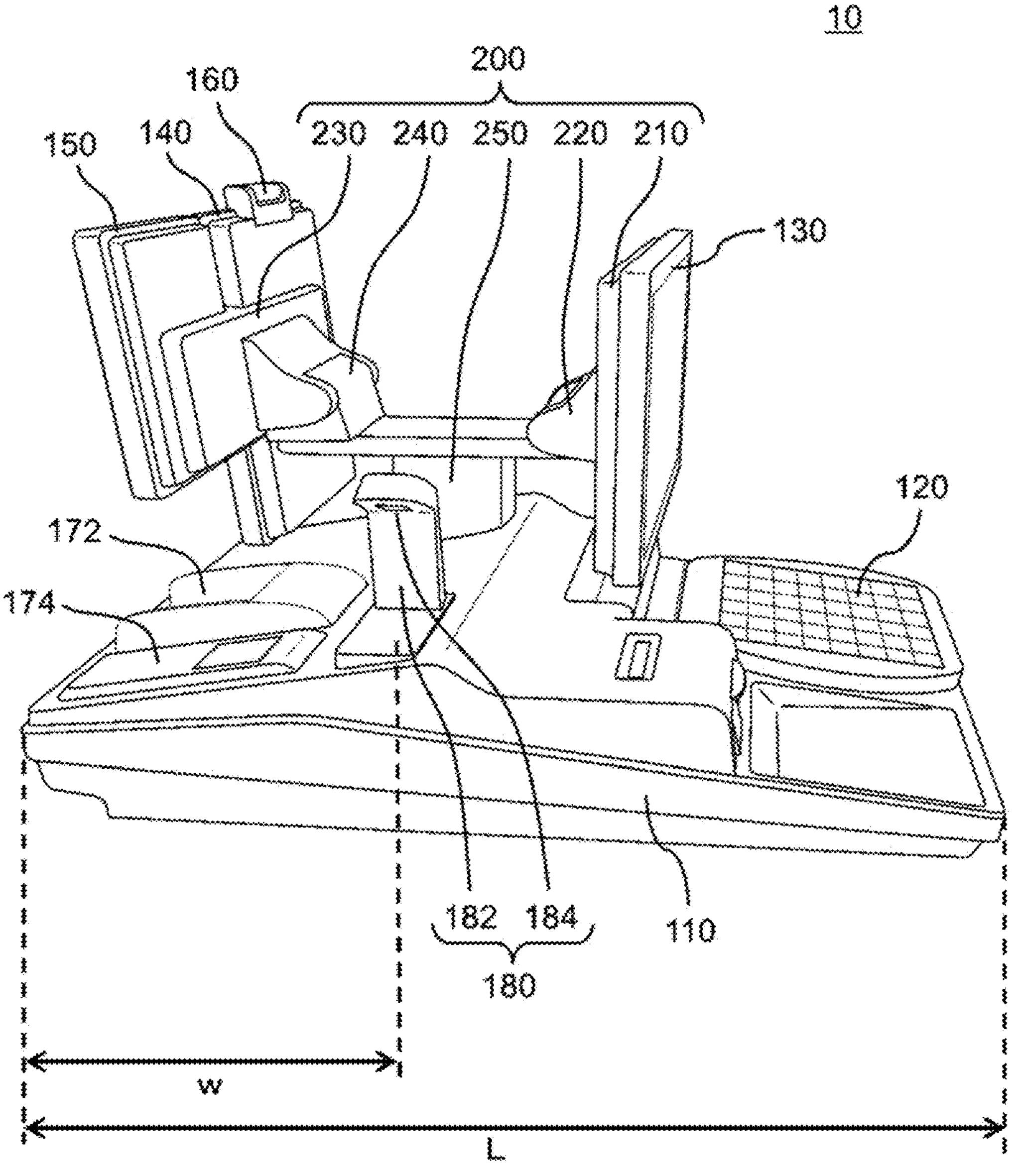
FIG. 2 is a side view of the terminal apparatus.

FIG. 1 is a perspective view of a terminal apparatus 10 according to an example embodiment, and FIG. 2 is a side view of the terminal apparatus 10. The terminal apparatus 10 is used at a store, for example, and performs at least one of product registration processing and settlement processing. When the pieces of processing are performed, the terminal apparatus 10 is located between a salesclerk and a customer. One example of the terminal apparatus 10 is a POS terminal. The terminal apparatus 10 is disposed on a cash register counter, for example.

The terminal apparatus 10 includes a first display 150, a second display 140, and an input device 172. The first display 150 is located next to the second display 140. Further, a lower end of the first display 150 is located higher than a lower end of the second display 140. The input device 172 is located below the first display 150. In this way, a space for a customer or a salesclerk to perform an input on the input device 172 is generated between the input device 172 and the first display 150. Hereinafter, the terminal apparatus 10 will be described in detail.

The terminal apparatus 10 includes a housing 110. An arithmetic processing unit is housed in the housing 110. The arithmetic processing unit performs at least one of, for example, both of the product registration processing and the settlement processing. Further, the arithmetic processing unit controls the second display 140, the first display 150, and a third display 130 described below.

The input device 172 and an input device 174 are disposed on one surface, for example, an upper surface of the housing 110. In the example illustrated in FIG. 1, the input devices 172 and 174 are operated by a customer, and are thus located closer to a customer side than the center of the upper surface of the housing 110 in a plan view. One example of the input device 172 is a device including a numeric keypad, and one example of the input device 174 is a reading apparatus that reads information from a medium. For example, the medium used herein may be a card including an IC chip, may be a portable terminal such as a smartphone, and may be paper on which a code is printed. The code used herein may be a bar code or a two-dimensional code. The input device 174 may read information from a medium by generating an image, may acquire information by performing short-range wireless communication with a medium, and may acquire information from a magnetic medium in a medium. Note that, the input device 174 may further have a function of writing information to a medium.

The first display 150 and the second display 140 are located higher than the housing 110 and also face the customer side. The first display 150 is smaller than the second display 140. For example, a width in a height direction of the first display 150 is equal to or more than 0.5 times and equal to or less than 0.8 times a width in a height direction of the second display 140. Further, the first display 150 and the second display 140 face in the same direction. For example, an angle formed by a normal line of the first display 150 and a normal line of the second display 140 is, for example, equal to or less than 30° and, furthermore, equal to or less than 15°.

One of the first display 150 and the second display 140 displays information about the settlement processing of a product, for example, a registered product name, a price, a total payment amount, a payment method, an amount of change, and the like. Further, another of the first display 150 and the second display 140 displays an advertisement. However, the pieces of information displayed on the first display 150 and the second display 140 may be reversed.

Further, a capturing unit 160 is attached to the second display 140. An image generated by the capturing unit 160 includes a customer. Then, the image is used when, for example, an advertisement to be displayed on the first display 150 or the second display 140 is selected. Note that, the capturing unit 160 may be attached to the first display 150.

In the example illustrated in FIG. 1, both of the first display 150 and the second display 140 are vertically oriented. However, at least one of the first display 150 and the second display 140, for example, the first display 150 may be horizontally oriented.

As described above, the input devices 172 and 174, the first display 150, and the second display 140 face the customer side. However, they may face a salesclerk side.

The terminal apparatus 10 includes a keyboard 120 and the third display 130. The keyboard 120 is operated by a salesclerk, and the third display 130 faces the salesclerk side. Note that, when the first display 150 and the second display 140 face the salesclerk side, the third display 130 faces the customer side. Further, in this case, the keyboard 120 is disposed on the same side as the third display 130.

The terminal apparatus 10 further includes a code reader 180. The code reader 180 reads a code of a product, for example, at least one of a bar code and a two-dimensional code. In the example illustrated in FIG. 1, the code reader 180 includes a strut 182 and a reading unit 184. The strut 182 is provided upright from the upper surface of the housing 110. The reading unit 184 extends obliquely upward from an upper portion of the strut 182, and includes a mechanism for reading a code on a lower surface side. Since the reading unit 184 extends obliquely upward, a readable region of a code by the code reader 180 spreads obliquely downward from the lower surface of the reading unit 184. Thus, as compared to when the reading unit 184 extends in a horizontal direction in the code reader 180, a larger product can be disposed in the readable region.

Further, as illustrated in FIG. 2, when a width of the housing 110 is L in a depth direction of the housing 110, i.e., a direction connecting the customer side and the salesclerk side, a distance w from an end portion of the housing 110 on the customer side to the center of the strut 182 is equal to or more than L/3 and equal to or less than 2L/3 from the customer side. Then, the reading unit 184 extends from the strut 182 toward a surface of side surfaces of the housing 110 that does not face a customer and a salesclerk. Thus, both of a salesclerk and a customer can use the code reader 180.

Further, as illustrated in FIG. 2, the first display 150, the second display 140, and the third display 130 are supported by a support portion 200. Specifically, the support portion 200 includes a strut portion 250, holding portions 210 and 230, and rotating portions 220 and 240.

The strut portion 250 has a columnar shape or a cylindrical shape, and is provided upright from the upper surface of the housing 110. The holding portion 210 is fixed to an upper portion of the strut portion 250 via the rotating portion 220, and the holding portion 230 is fixed to the upper portion of the strut portion 250 via the rotating portion 240.

The holding portion 210 is fixed to a back surface of the third display 130. The rotating portion 220 attaches the holding portion 210 to an upper portion of the strut portion 250 in a state where the holding portion 210 can rotate in both of an up-and-down direction and the horizontal direction. Thus, the third display 130 can rotate in at least one of, preferably, both of the up-and-down direction and the horizontal direction with respect to the housing 110.

The holding portion 230 is fixed to a back surface of the first display 150 and a back surface of the second display 140. The rotating portion 240 attaches the holding portion 230 to an upper portion of the strut portion 250 in a state where the holding portion 230 can rotate in both of the up-and-down direction and the horizontal direction. Thus, the first display 150 and the second display 140 can rotate in at least one of, preferably, both of the up-and-down direction and the horizontal direction with respect to the housing 110.

Note that, in the example illustrated in FIG. 2, the first display 150 and the second display 140 are integral by the holding portion 230. Thus, orientations of the first display 150 and the second display 140 change simultaneously. However, the first display 150 and the second display 140 may be able to rotate independently of each other in at least one of the up-and-down direction and a left-and-right direction.

Figure 3:
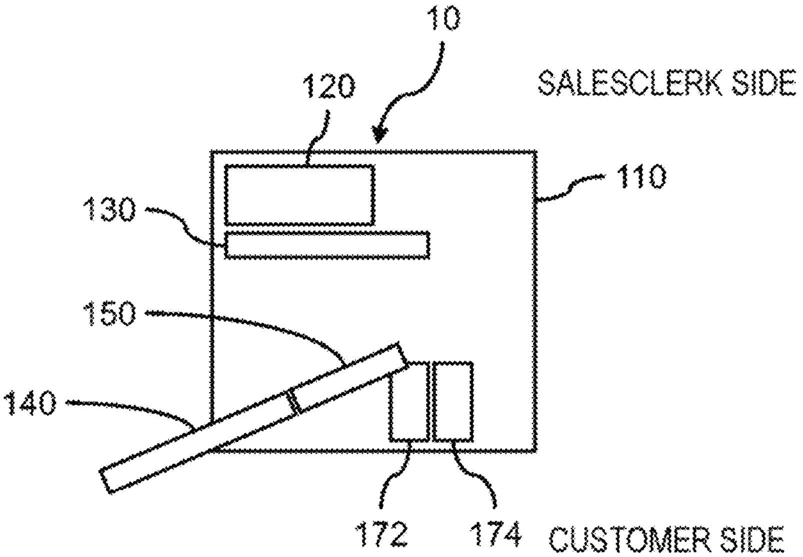
FIG. 3 is a diagram illustrating a first example of a relative position between input devices and a first display.
Figure 4:
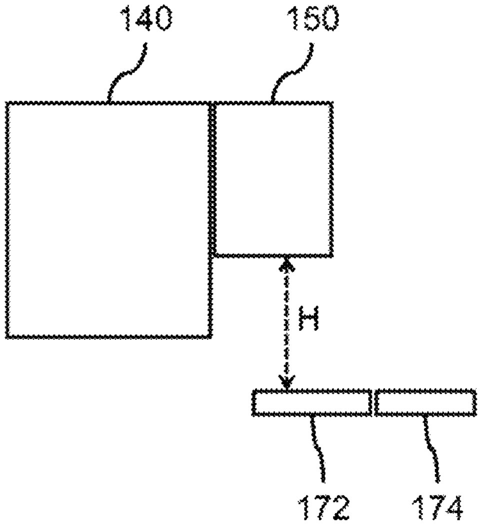
FIG. 4 is a diagram illustrating the first example of the relative position between the input devices and the first display.

FIGS. 3 and 4 are diagrams illustrating a first example of a relative position between the input devices 172 and 174 and the first display 150. FIG. 3 is a schematic diagram of the terminal apparatus 10 in a plan view, and FIG. 4 is a schematic diagram when the terminal apparatus 10 is viewed from the customer side.

As described above, the input devices 172 and 174 are located below the first display 150. As illustrated in FIG. 3, the input device 172 is located closer to the first display 150 side than the input device 174 in the plan view. The first display 150 can rotate, but at least a part of the input device 172 overlaps a part of the first display 150 in a position of the first display 150 illustrated in FIG. 3. However, the input device 172 and the input device 174 may be reversed. In this case, at least a part of the input device 174 overlaps a part of the first display 150 in the plan view. Further, both of the input devices 172 and 174 may overlap a part of the first display 150.

Further, at least a part of the first display 150 and at least a part of the second display 140 overlap the housing 110.

Further, as illustrated in FIG. 4, a distance H from an input region of the input device 172 where information is input, such as an installation surface of the numeric keypad and a surface where short-range wireless communication is performed, to the lower end of the first display 150 is preferably equal to or more than 10 cm, more preferably equal to or more than 15 cm, and still more preferably equal to or more than 20 cm. In such a manner, it is easy for a customer to perform an input on the input device 172.

Further, a difference in height between an upper end of the first display 150 and an upper end of the second display 140 is preferably equal to or less than 1 cm and more preferably equal to or less than 5 mm. In such a manner, it is easy for a customer to recognize both of information displayed on the first display 150 and information displayed on the second display 140.

Figure 5:
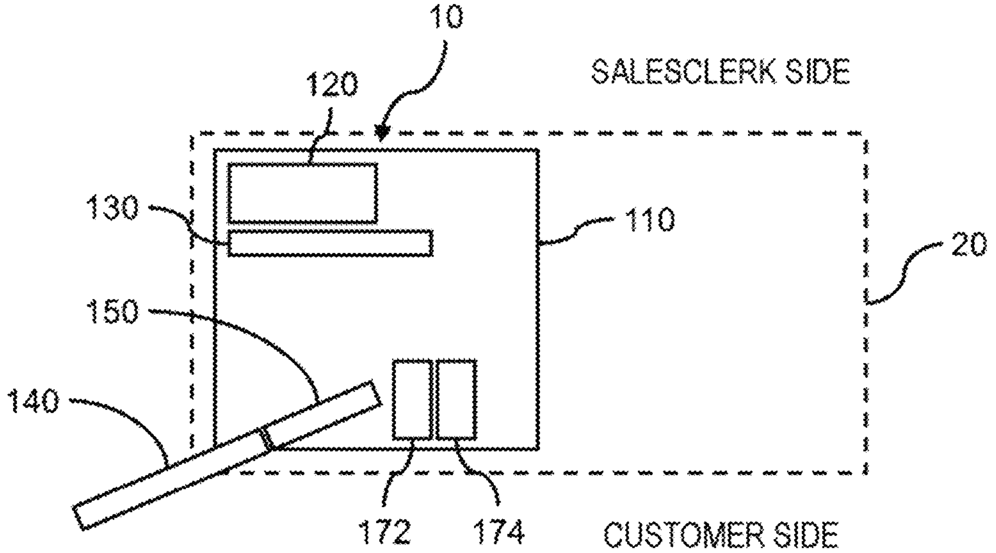
FIG. 5 is a diagram illustrating a second example of a relative position between the input devices and the first display.
Figure 6:
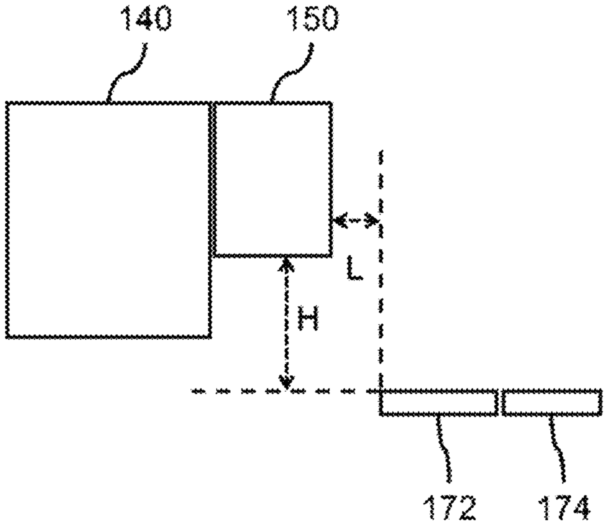
FIG. 6 is a diagram illustrating the second example of the relative position between the input devices and the first display.

FIGS. 5 and 6 are diagrams illustrating a second example of a relative position between the input devices 172 and 174 and the first display 150, and respectively correspond to FIGS. 3 and 4 in the first example. As described above, the first display 150 and the second display 140 can rotate in the horizontal direction with respect to the housing 110. Thus, depending on an orientation of the second display 140 and the first display 150, the first display 150 and the input region of the input device 172 may not overlap each other in the plan view as illustrated in FIGS. 5 and 6. In other words, the first display 150 can have a first state of overlapping the input device 172 and a second state of not overlapping the input device 172.

Then, the terminal apparatus 10 may be used in the second state. Also, in this case, when a shortest distance L (see FIG. 6) from the input region of the input device 172 to the first display 150 is short, for example, equal to or less than 5 cm in a front view, i.e., a view from the customer side, it is difficult for a customer to perform an input on the input device 172 due to presence of the first display 150 depending on a length of the distance H described above. In contrast, when the distance H described above is set to be equal to or more than 10 cm, the first display 150 is less likely to interfere when a customer performs an input on the input device 172.

Note that, even when the first display 150 faces in any direction, a positional relationship between the first display 150 and the input device 172 may be set in the second example but may not be set in the first example. Also, in this case, when the distance H described above is set to be equal to or more than 10 cm, the first display 150 is less likely to interfere when a customer performs an input on the input device 172.

As described above, the terminal apparatus 10 includes the first display 150, the second display 140, and the input device 172. The input region of the input device 172 where a person performs an input is located below the first display 150, but the lower end of the first display 150 is located higher than the lower end of the second display 140. Therefore, when a person inputs information to the input device 172, there is a low possibility that the first display 150 interferes.

While the example embodiments of the present invention have been described with reference to the drawings, the example embodiments are only exemplification of the present invention, and various configurations other than the above-described example embodiments can also be employed.

A part or the whole of the above-described example embodiment may also be described in supplementary notes below, which is not limited thereto.

1. A terminal apparatus being used when at least one of product registration processing and settlement processing is performed, the terminal apparatus including:
   - a first display;
   - a second display; and
   - an input device disposed in a region located below the first display, wherein
   - the first display is located next to the second display, and
   - a lower end of the first display is located higher than a lower end of the second display.
2. The terminal apparatus according to supplementary note 1 described above, further including:
   - an arithmetic processing unit; and
   - a housing that houses the arithmetic processing unit, wherein
   - the first display and the second display are located higher than the housing, and
   - the input device is disposed on one surface of the housing.
3. The terminal apparatus according to supplementary note 1 or 2 described above, wherein
   - a difference in height between a lower end of the first display and an input surface of the input device is equal to or more than 15 cm.
4. The terminal apparatus according to any one of supplementary notes 1 to 3 described above, wherein
   - a difference in height between an upper end of the first display and an upper end of the second display is equal to or less than 1 cm.
5. The terminal apparatus according to any one of supplementary notes 1 to 4 described above, wherein
   - the terminal apparatus is located between a salesclerk and a customer when at least one of product registration processing and settlement processing is performed, and
   - the first display and the second display face to the customer side.
6. The terminal apparatus according to any one of supplementary notes 1 to 5 described above, further including
   - a holding member that holds the first display and the second display, wherein
   - orientations of the first display and the second display change simultaneously by the holding member in at least one of a horizontal direction and an up-and-down direction.
7. The terminal apparatus according to supplementary note 6 described above, wherein
   - the first display and the second display can rotate in the horizontal direction, and
   - the first display can have both of a first state of overlapping the input device and a second state of not overlapping the input device.
8. The terminal apparatus according to any one of supplementary notes 1 to 7 described above, wherein
   - both of the first display and the second display are vertically oriented.
9. The terminal apparatus according to any one of supplementary notes 1 to 8 described above, wherein
   - the input device includes a numeric keypad.

REFERENCE SIGNS LIST

10 Terminal apparatus
110 Housing

120 Keyboard
130 Third display
140 Second display
150 First display
160 Capturing unit
172 Input device
174 Input device
180 Code reader
182 Strut
184 Reading unit
200 Support portion
210 Holding portion
220 Rotating portion
230 Holding portion
240 Rotating portion

What is claimed is:

1. A terminal apparatus being used when at least one of product registration processing and settlement processing is performed, the terminal apparatus comprising:
- a first display;
- a second display; and
- an input device disposed in a region located below the first display, wherein
- the first display is located next to the second display,
- a lower end of the first display is located higher than a lower end of the second display,
- a difference in height between an upper end of the first display and an upper end of the second display is equal to or less than 1 cm, and
- the first display and the second display face a customer side, or the first display and the second display face a salesclerk side.

2. The terminal apparatus according to claim 1, further comprising:
- at least one memory configured to store instructions; and
- at least one processor configured to execute the instructions to perform an arithmetic processing and
- a housing that houses the memory and the processor, wherein
- the first display and the second display are located higher than the housing, and
- the input device is disposed on one surface of the housing.

3. The terminal apparatus according to claim 1, wherein
- a difference in height between a lower end of the first display and an input surface of the input device is equal to or more than 15 cm.

4. The terminal apparatus according to claim 1, wherein both of the first display and the second display are vertically oriented.

5. The terminal apparatus according to claim 1, wherein the input device includes a numeric keypad.

6. A terminal apparatus being used when at least one of product registration processing and settlement processing is performed, the terminal apparatus comprising:
- a first display;
- a second display; and
- an input device disposed in a region located below the first display, wherein
- the first display is located next to the second display, and
- a lower end of the first display is located higher than a lower end of the second display, and wherein
- the terminal apparatus is located between a salesclerk and a customer when at least one of product registration processing and settlement processing is performed, and
- the first display and the second display face the customer side.

7. A terminal apparatus being used when at least one of product registration processing and settlement processing is performed, the terminal apparatus comprising:
- a first display;
- a second display; and
- an input device disposed in a region located below the first display, wherein
- the first display is located next to the second display,
- a lower end of the first display is located higher than a lower end of the second display, and
- a difference in height between an upper end of the first display and an upper end of the second display is equal to or less than 1 cm,
- wherein the first display and the second display are coupled to a holding portion such that moving the holding portion moves the first display and the second display simultaneously.

8. The terminal apparatus according to claim 7, wherein
- the holding portion is configured to be rotated in at least one of a horizontal direction or an up-and-down direction, and
- the first display can have both of a first state of overlapping the input device and a second state of not overlapping the input device.

* * * * *